United States Patent
Cheng

(10) Patent No.: US 9,526,205 B1
(45) Date of Patent: Dec. 27, 2016

(54) LAWN MOWER WITH ADJUSTABLE BASE FRAME

(71) Applicant: Yu Hsin Cheng, Yuanli Township, Miaoli County (TW)

(72) Inventor: Yu Hsin Cheng, Yuanli Township, Miaoli County (TW)

( * ) Notice: Subject to any disclaimer, the term of this patent is extended or adjusted under 35 U.S.C. 154(b) by 0 days.

(21) Appl. No.: 14/733,954

(22) Filed: Jun. 8, 2015

(51) Int. Cl.
| *A01D 34/00* | (2006.01) |
| *A01D 34/67* | (2006.01) |
| *A01D 34/416* | (2006.01) |
| *A01D 101/00* | (2006.01) |

(52) U.S. Cl.
CPC ............. *A01D 34/67* (2013.01); *A01D 34/001* (2013.01); *A01D 34/416* (2013.01); *A01D 2101/00* (2013.01)

(58) Field of Classification Search
CPC combination set(s) only.
See application file for complete search history.

(56) References Cited

U.S. PATENT DOCUMENTS

| 4,411,126 A | * | 10/1983 | Lowry | A01D 34/001 56/12.7 |
| 4,587,800 A | * | 5/1986 | Jimenez | A01G 3/062 56/16.7 |
| 4,688,376 A | * | 8/1987 | Wolfe, Sr. | A01D 34/001 56/12.7 |
| 5,626,006 A | * | 5/1997 | Fricke, Sr. | A01D 34/001 30/276 |
| 5,839,262 A | * | 11/1998 | Sorensen | A01D 34/001 30/276 |
| 2002/0043058 A1 | * | 4/2002 | McBlair | A01D 34/001 56/12.7 |

* cited by examiner

*Primary Examiner* — Alicia Torres
(74) *Attorney, Agent, or Firm* — Leong C. Lei

(57) ABSTRACT

A lawn mower has a base member that provides protection frames around a blade assembly and height-of-cut control for a lawn. The base member contains a connection piece having lateral edges configured with a notch for configuration of the base member onto the blade assembly in two perpendicular orientations. The base member also contains front and back tubes for detachably connecting to the protection frames in an adjustable manner to cover the revolving range of the blade assembly. Wheels are rotatably configured on the protection frames so that the lawn mower can be moved around the lawn.

9 Claims, 8 Drawing Sheets

LAWN MOWER WITH ADJUSTABLE BASE FRAME

BACKGROUND OF THE INVENTION (a) Technical Field of the Invention

The present invention is generally related to lawn mowers, and more particular to a lawn mower with a flexible and convenient protection mechanism.

(b) Description of the Prior Art

A simplified lawn mower, as taught by R.O.C. Patent No. M458784, has a hand-held tubular handle with a motor configured at an end driving a blade set configured at the other end through a transmission element inside the handle. A belt is provided so that the lawn mower can be carried over the shoulder while both hands can be used to operate the lawn mower steadily. Additionally, an auxiliary handle can be configured in a middle section of the handle so as to facilitate the control of the lawn mower. However, due to users' different height and arm lengths, the operation of the lawn mower sometimes can be uncomfortable or laborious. Furthermore, it is also difficult to achieve an even height to the cut lawn, and it is not uncommon that the blades cut some hard objects. An operator has to quite skillful so as to reduce the operation hazard. Therefore, for example as taught by R.O.C. Patent No. M469735, protection frames are fixedly arranged to the lateral sides of the blades for safety's sake. But for blades of different lengths, compatible protection frames have to be installed, thereby increasing assembly inconvenience and production cost. Additionally, the protection frames can turn aslant after bumping into some hard objects. Also the lawn mower requires manual operation all the time, which is inconvenient and tiresome. The protection frames also makes the entire lawn mower bulky, increasing the packaging cost.

SUMMARY OF THE INVENTION

A novel lawn mower is provided herein to obviate the shortcomings of the prior art. The lawn mower provides, in addition to an auxiliary handle for better control and reduced effort in operating the lawn mower, a base member that provides easy and flexible configuration of protection frames so that the blades are well protected from being damaged by hard objects and the height of the lawn can be easily controlled. Additionally, the lawn mower is mounted with wheels so that the lawn mower can be conveniently moved over the lawn.

The base member contains a connection piece where each of the connection piece's lateral edges is configured with a notch, allowing the configuration of the base member onto a blade assembly in two perpendicular orientations. The base member also contains front and back tubes for detachably configuring protection frames adjustable to cover the revolving range of the blades. Wheels are then rotatably configured on the protection frames so that the lawn mower can freely and effortlessly move around the lawn.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
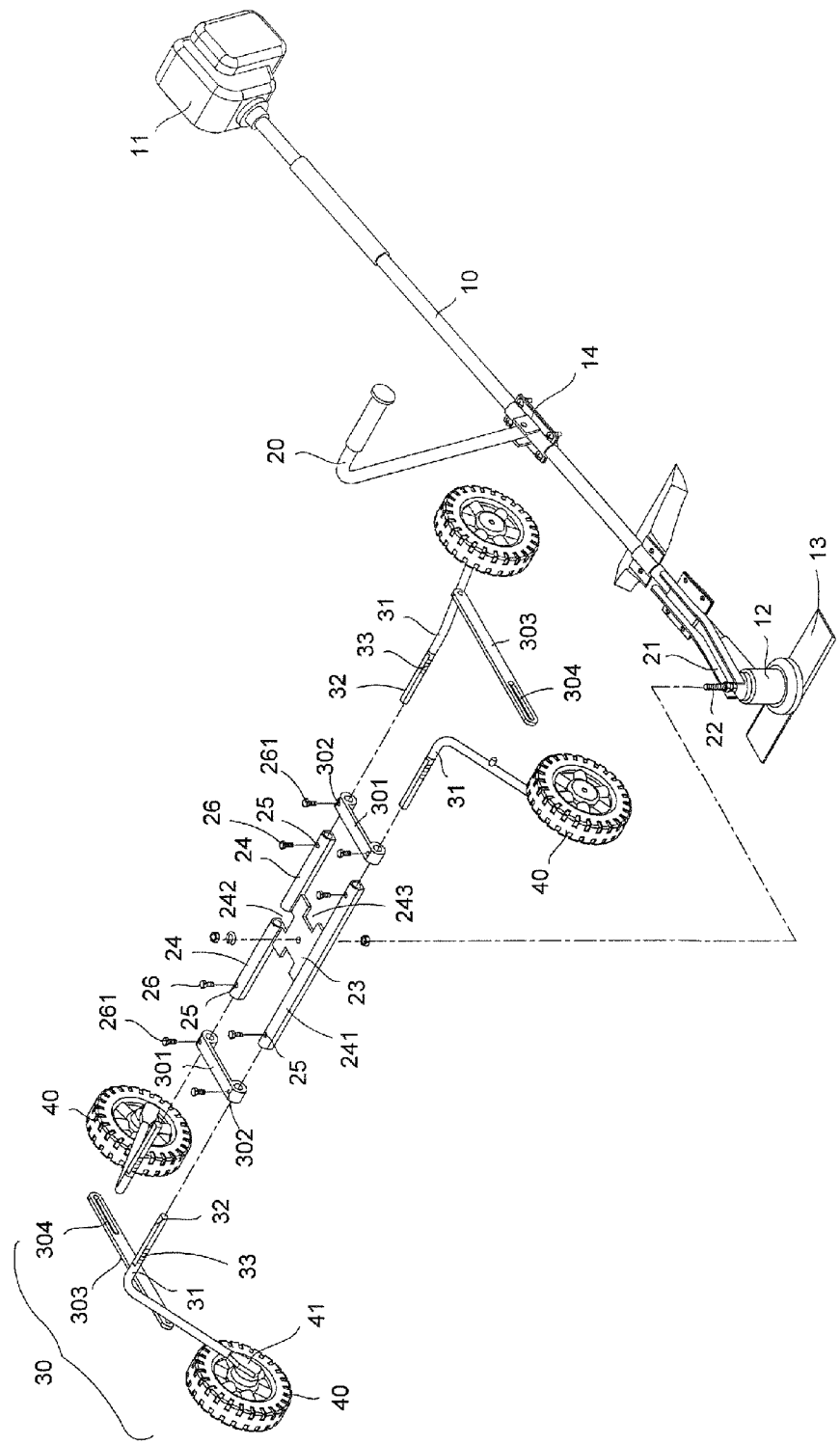
FIG. 1 is a perspective break-down diagram showing the various components of a lawn mower according to a first embodiment of the present invention.
Figure 2:
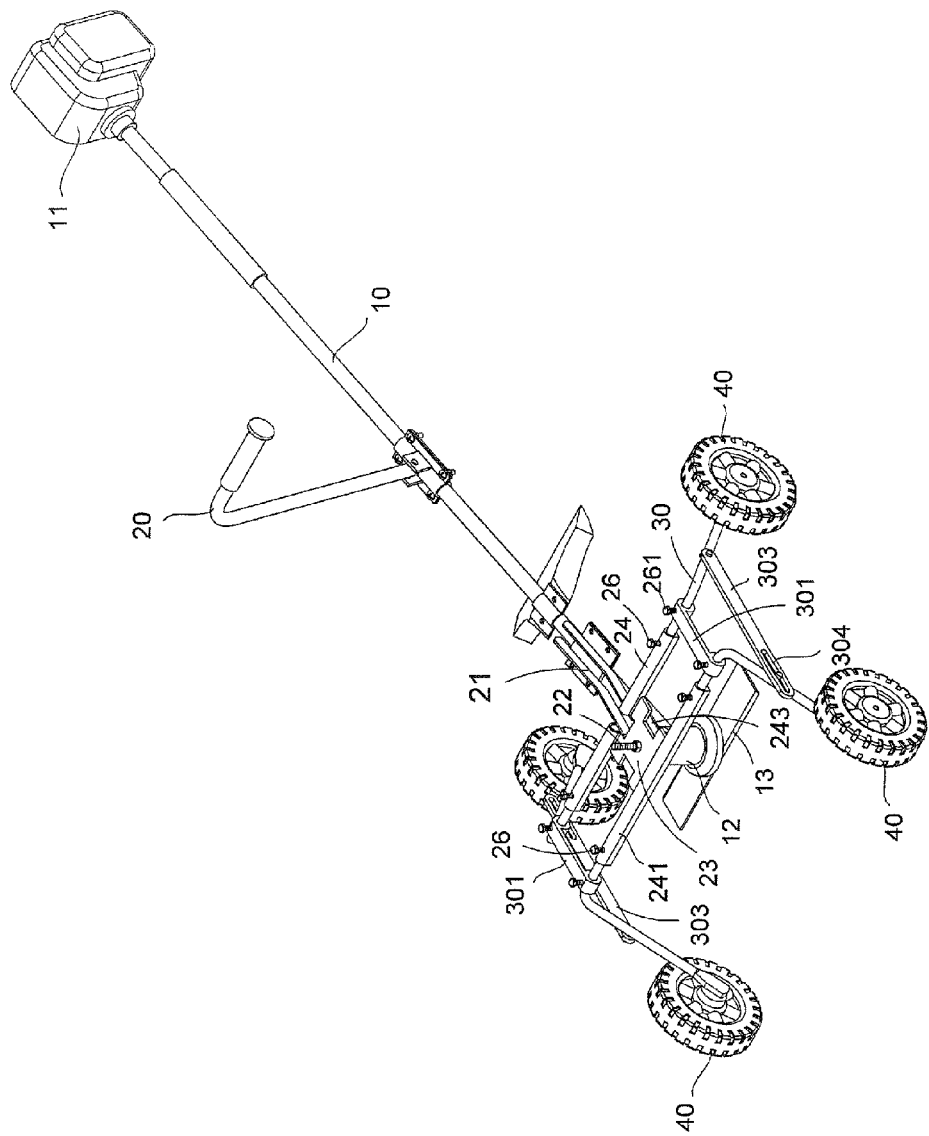
FIG. 2 is a perspective diagram showing the lawn mower of FIG. 1 after assembly.
Figure 3:
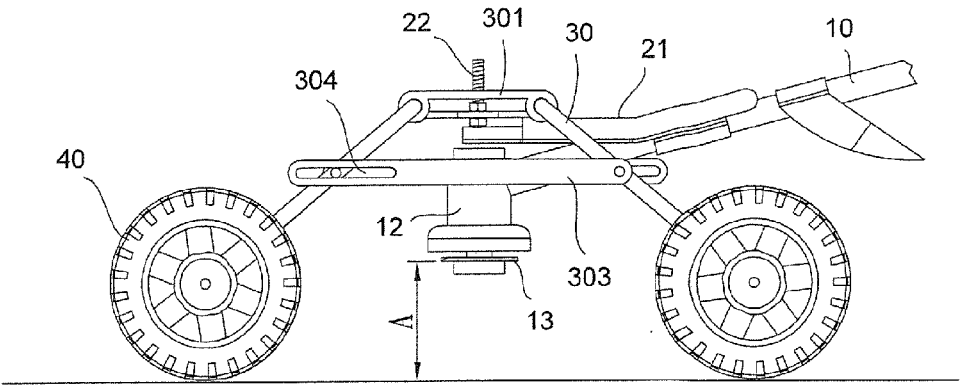
FIG. 3 is a profile diagram showing the lawn mower of FIG. 1.
Figure 4:
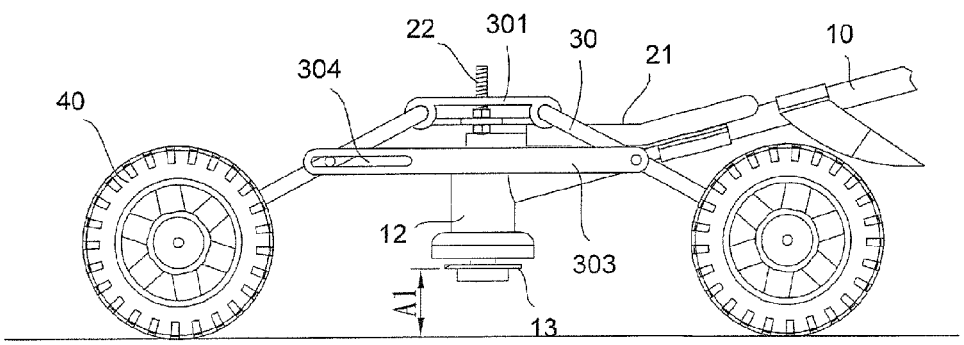
FIG. 4 is a profile diagram showing the lawn mower of FIG. 3 with a different distance between the blades of the lawn mower and the ground.
Figure 10:
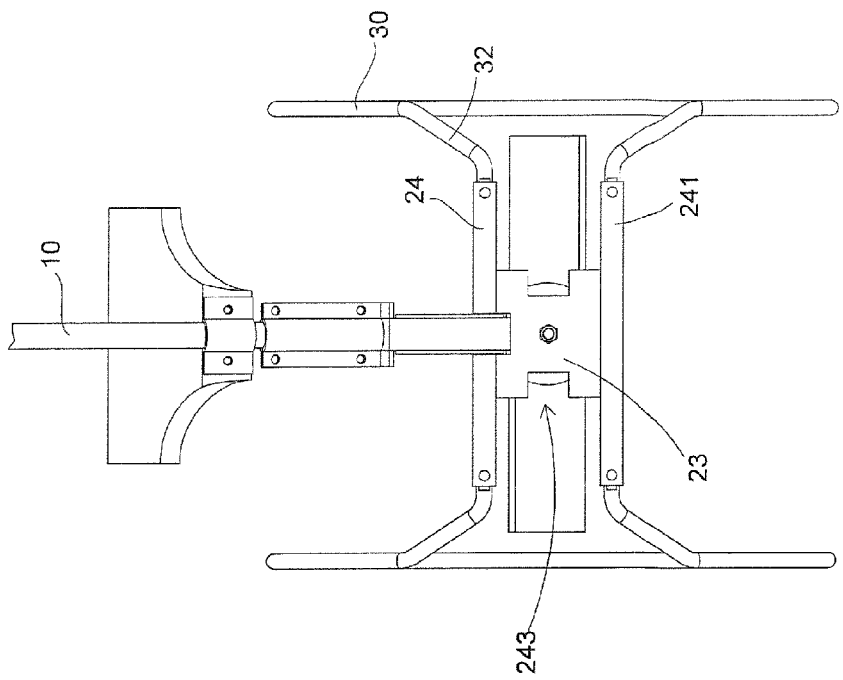
FIG. 10 is a schematic top-view diagram showing the lawn mower of FIG. 9 with a different orientation of a base member of the lawn mower.
Figure 9:
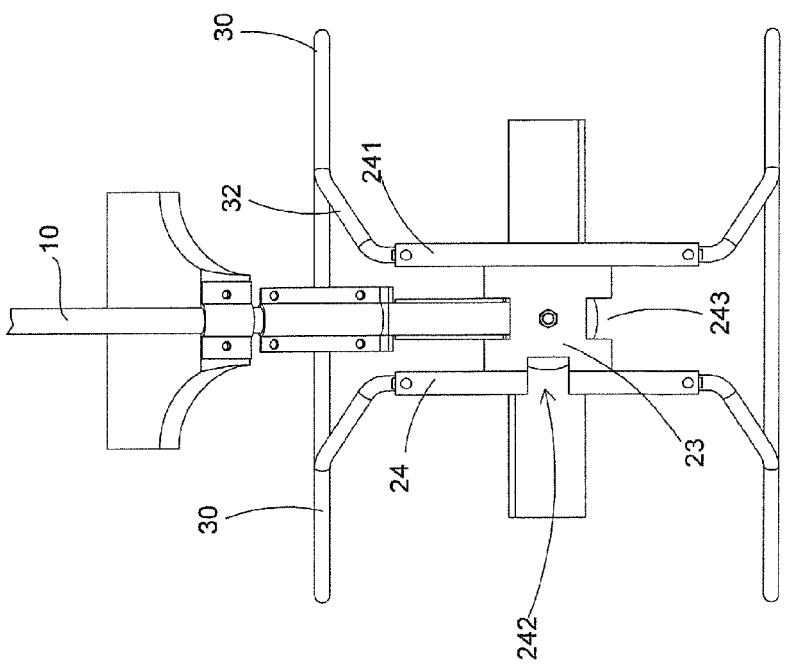
FIG. 9 is a schematic top-view diagram showing a lawn mower of the present invention.

As shown in FIGS. 1 to 4, a lawn mower according to a first embodiment of the present invention contains a tubular handle 10 and a motor 11 configured at an end of the tubular handle 10. The motor 11 engages a blade assembly 12 through a transmission element (not shown) running through the tubular handle 10. The transmission element has a first end connected to the motor 11 and a second end connected to an axle (not numbered) of the blade assembly 12. A set of blades 13 of the blade assembly 12 is therefore driven to revolve by the motor 11. What is described so far is pretty much similar to what is employed by existing lawn mowers and their details are as such omitted. One improvement of the present invention is the adjustable configuration of an auxiliary handle 20 to the tubular handle 10 through a connection base 14 at a middle section of the tubular handle 10. The auxiliary handle 20 has an inverted-L shape or a U-like shape so as to provide additional control and convenience to the operation of the lawn mower. Additionally, a pair of support pieces 21 are extended from the tubular handle 10 from adjacent the second end to a top side of the blade assembly 12. Between the support pieces 21, a bolt 22 is configured on the top side of the blade assembly 12 for the installation of a base member. The base member contains a first tube 241, two second tubes 24, and a connection piece 23. The first tube 241 is configured along a front edge of the connection piece 23 whereas the second tubes 24 are axially aligned and configured along a back edge of the connection piece 23 with a gap 243 between the two second tubes 24. Each of the connection piece 23's lateral edges is configured with a notch 243. As shown in FIGS. 9 and 10, the gap 242 and the notches 243 allow the configuration of the base member onto the blade assembly 12 in two perpendicular orientations. In one of the orientations, the support pieces 21 are either received by the gap 242 or by one of the notches 243. As such, the tubular handle 10 can be joined to the base member in two mutually perpendicular manners. Each of the first tube 241's two ends, and each of the second tubes 24's outer ends have a bolt hole 25, respectively, for the fastening of bolts 26. Two lateral sides of the base member are further configured with protection frames 30. Each protection frame 30 contains two L-shaped leg pieces 31, a bridge element 301, and a link piece 303. The bridge piece 301 runs across an outer end of first tube 241 and an outer end of a second tube 24, with holes at both ends matching the first tube 241 and the second tube 24. A flattened segment 32 of a front leg piece 31 is threaded into the first tube 241 through a corresponding hole of the bridge element 301. Similarly, a flattened segment 32 of a back leg piece 31 is threaded into the second tube 24 through another corresponding hole of the bridge element 301. Each of the two holes of the bridge element 301 has a bolt hole 302 where a bolt 261 can run through and fasten the front or back leg piece 31. Marks 33 are configured on the front and back leg pieces 31 adjacent to the flattened segments 32, respectively, for inspecting how deep the leg pieces 32 are threaded into the front and second tubes 241 and 24. As such, the protection frames 30 can be adjusted to cover the revolving range of the blades 13. Each link piece 303 is configured between the front and back leg pieces 31 of a protection frame 30. Each link piece 303 has an elongated slot 304 at an end so that, as shown in FIGS. 3 and 4, an included angle between the front and back leg pieces 31 can be adjusted, thereby altering a distance A or A1 between the blades 13 and the ground. A wheel 40 is rotatably configured at another end of each leg piece 31 so that the lawn mower can freely and effortlessly move around the lawn.

Figure 5:
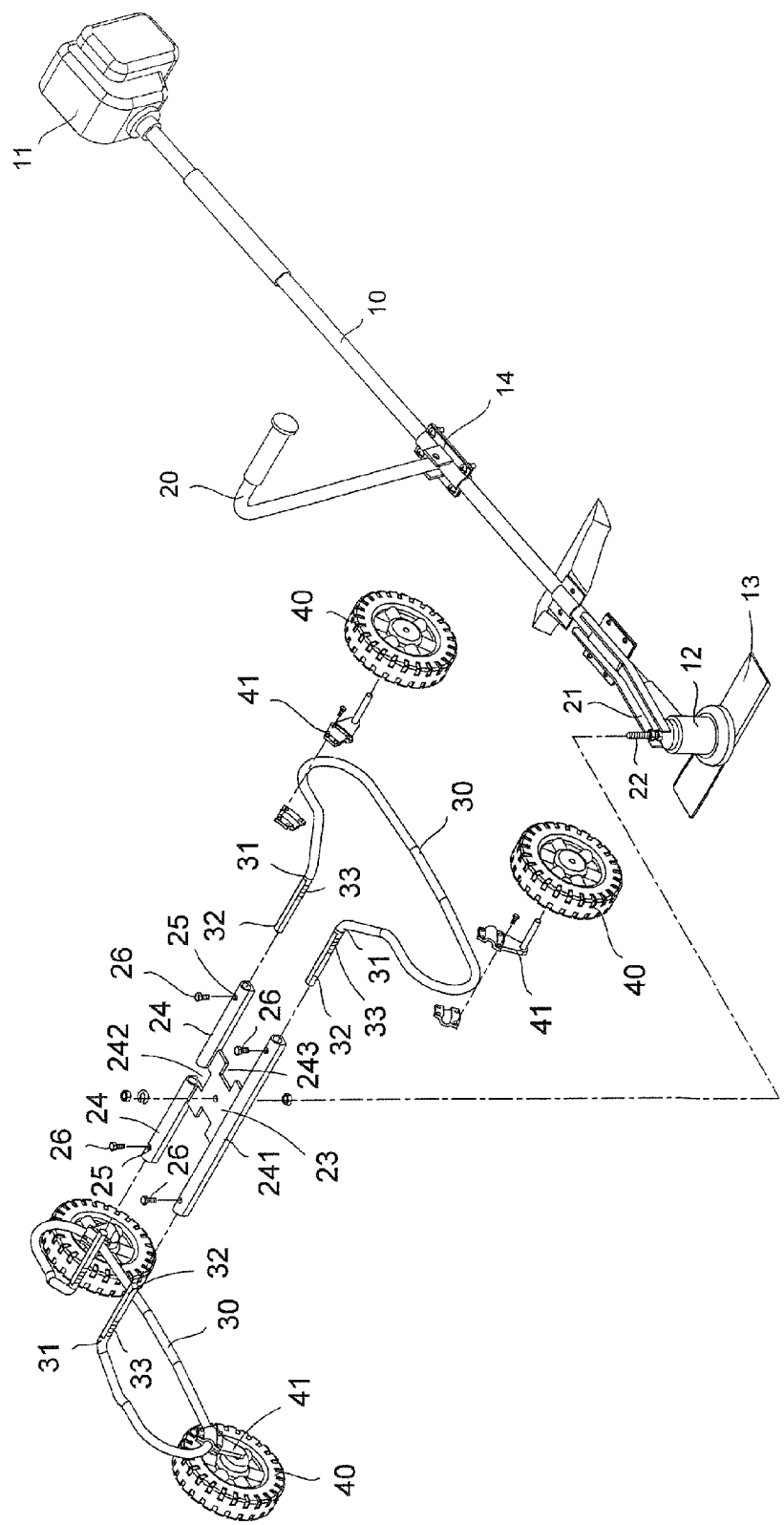
FIG. 5 is a perspective break-down diagram showing the various components of a lawn mower according to a second embodiment of the present invention.
Figure 6:
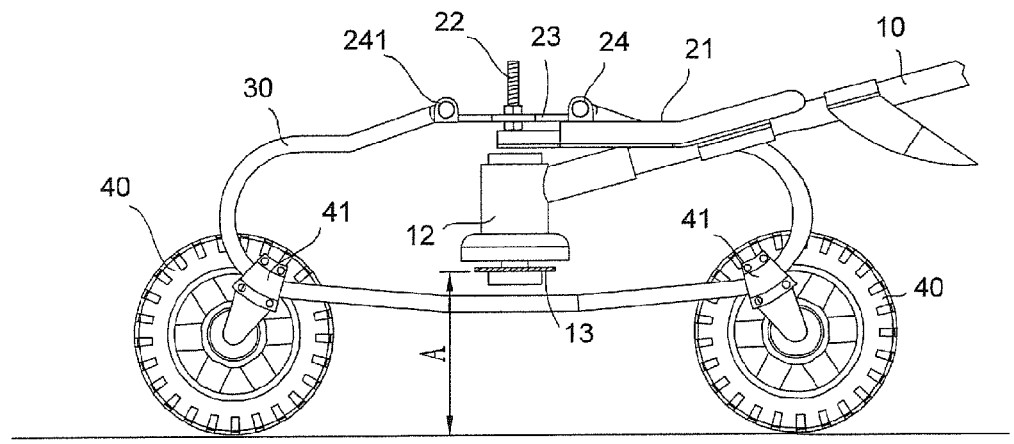
FIG. 6 is a profile diagram showing the lawn mower of FIG. 5.
Figure 7:
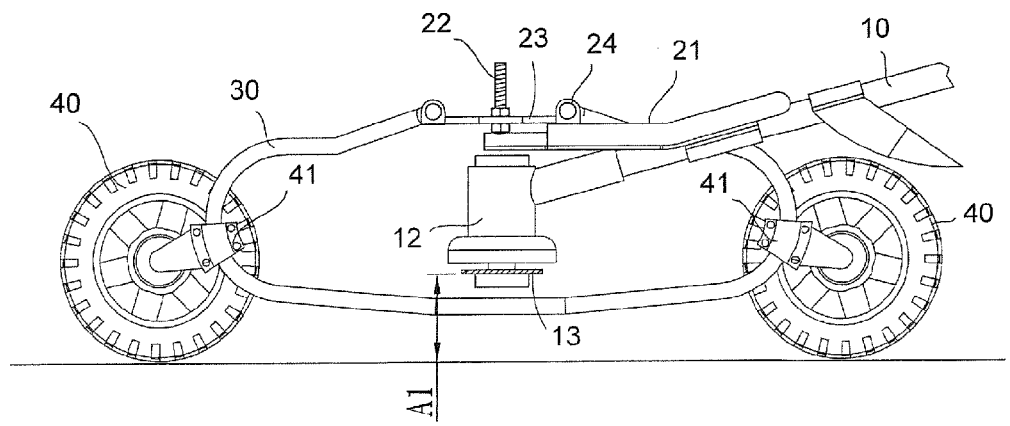
FIG. 7 is a profile diagram showing the lawn mower of FIG. 6 with a different distance between the blades of the lawn mower and the ground.
Figure 8:
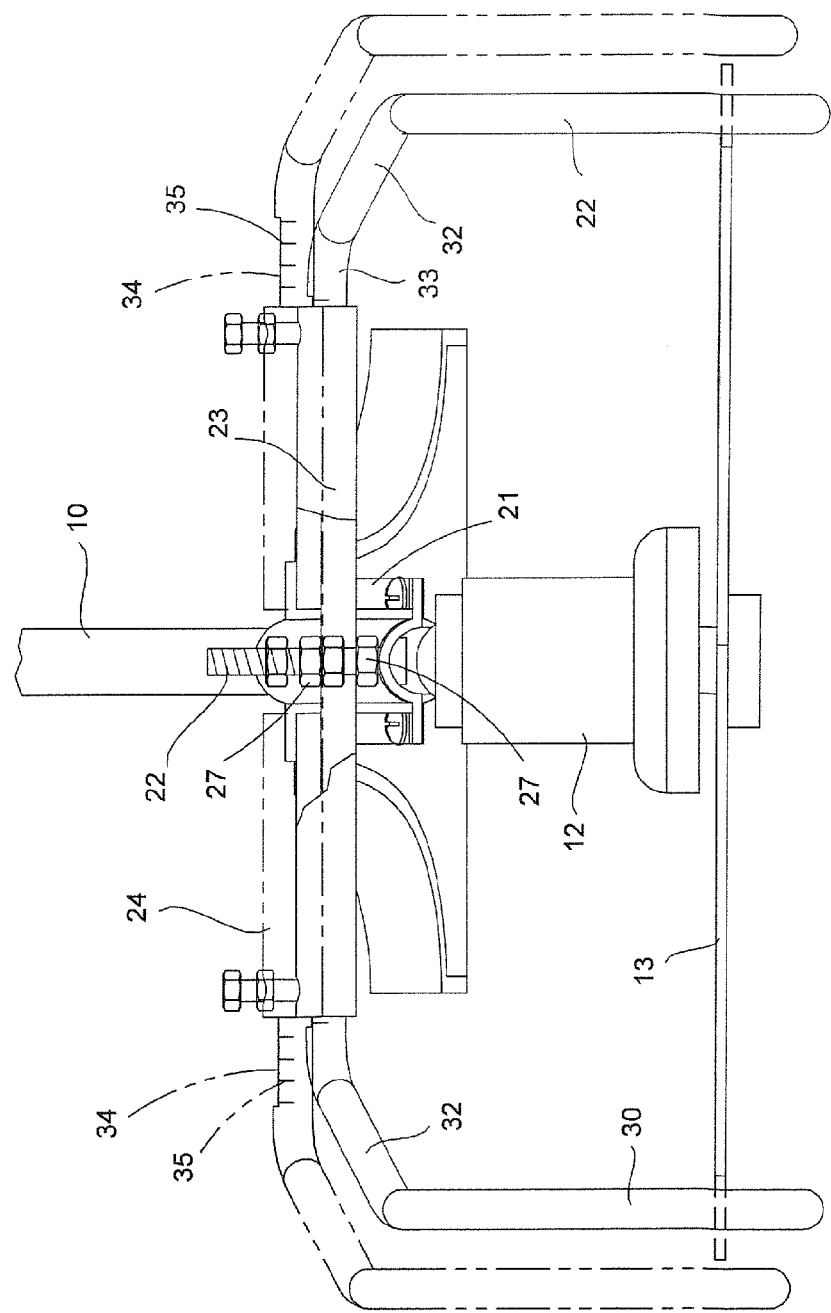
FIG. 8 is a schematic diagram showing how a lawn mower of the present invention is adjusted to provide different protection ranges.

As shown in FIGS. 5 to 7, a lawn mower according to a second embodiment of the present invention has its protection frames 30 integrally formed into an oval shape. Each wheel 40 is mounted onto a protection frame 30 through a wheel base 41. By adjusting the locations of the wheel bases 41 along the protection frame 30, the distance A or A1 between the blades 13 and the ground can be altered. To facilitate the moving of the lawn mower over the lawn, the diameter of each wheel 40 is preferably at least 10 cm. Each protection frame 30 also has laterally extended flattened segments 32 with marks 33 threading into the front and second tubes 241 and 24. By adjusting how deep the flattened segments 32 are plugged into the front and second tubes 241 and 24 as shown in FIG. 8, the protection frames 30 can be adjusted to cover the revolving range of the blades 13 and to prevent the blades 13 from colliding with hard objects.

Figure 11:
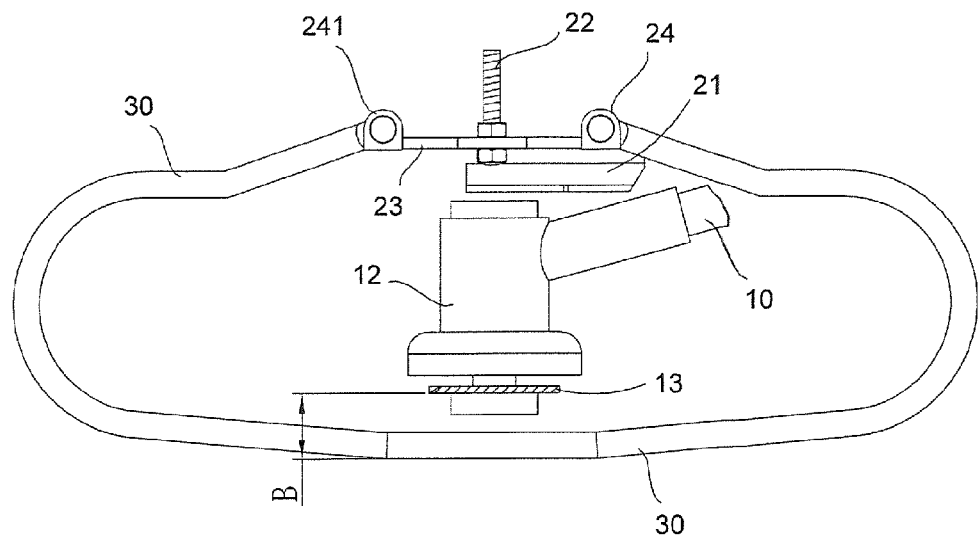
FIG. 11 is a profile diagram showing the lawn mower of FIG. 5 where a base member of the lawn mower is configured in one manner.
Figure 12:
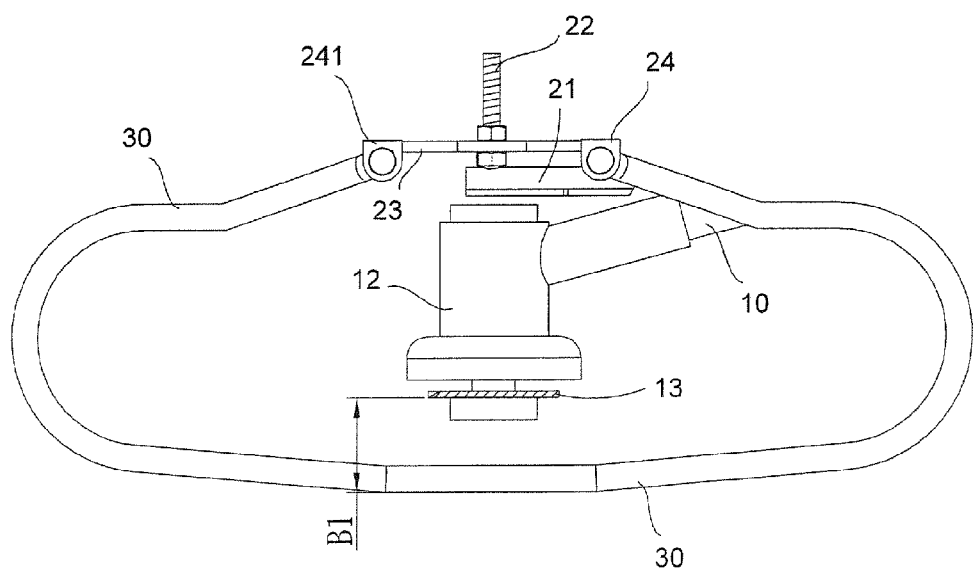
FIG. 12 is a profile diagram showing the lawn mower of FIG. 11 where a base member of the lawn mower is configured in another manner.

The mounting of the base member onto the blade assembly 12 in the previous embodiments is shown in FIG. 11 where the first tube 241 is in front of the second tubes 24. Alternatively, the base member can be put on the blade assembly 12 upside down where the second tubes 24 are in front of the first tube 241. The distance B or B1 between the blades 13 and the bottom edge of the protection frames 30 can be altered. Conventional lawn mowers can only adjust their blade height no more than 3 cm. The present invention, in contrast, can achieve a significantly greater adjustment by twisting only a few bolts.

As described above, the present invention provides an auxiliary handle for better control and reduced effort in operating the lawn mower. On the other hand, the base member provides easy and flexible configuration of the protection frames so that the blades are well protected from being damaged by hard objects and the height of the lawn can be easily controlled. Additionally, with the wheels mounted, the lawn mower can be conveniently moved over the lawn.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A lawn mower, comprising a tubular handle, a motor configured at a first end of the tubular handle, and a blade assembly at a second end of the tubular handle engaged by the motor through a transmission element running through the tubular handle, characterized in that:
   a pair of support pieces are extended from the tubular handle from adjacent the second end to a top side of the blade assembly;
   between the support pieces, a bolt is configured on the top side of the blade assembly;
   a base member detachably configured on the bolt;
   the base member comprises a connection piece, a first tube along a front edge of the connection piece, and two second tubes axially aligned and configured along a back edge of the connection piece with a gap in-between; and
   two protection frames, each with two laterally extended segments for detachably plugging into an end of the first tube and an end of a second tube, respectively;
   wherein the protection frames are adjustable to cover the revolving range of the blade assembly.

2. The lawn mower according to claim 1, wherein each of the connection piece's lateral edges is configured with a notch.

3. The lawn mower according to claim 1, wherein each of the first tube's two ends, and each of the second tubes' outer ends have a bolt hole, respectively, for the fastening of bolts.

4. The lawn mower according to claim 1, wherein each protection frame comprises two L-shaped leg pieces with the laterally extended segment, and a link piece configured between the leg pieces.

5. The lawn mower according to claim 1, wherein each protection frame is integrally formed into an oval shape.

6. The lawn mower according to claim 1, wherein each laterally extended segment of a leg piece is flattened.

7. The lawn mower according to claim 6, wherein the leg piece has marks adjacent to the laterally extended segment.

8. The lawn mower according to claim 1, wherein at least a wheel is rotatably mounted on each protection frame.

9. The lawn mower according to claim 1, wherein an auxiliary handle is adjustably configured in a middle section of the tubular handle.

\* \* \* \* \*